(No Model.)
R. M. CLARK.
WHEEL PLOW.
No. 289,223. Patented Nov. 27, 1883.
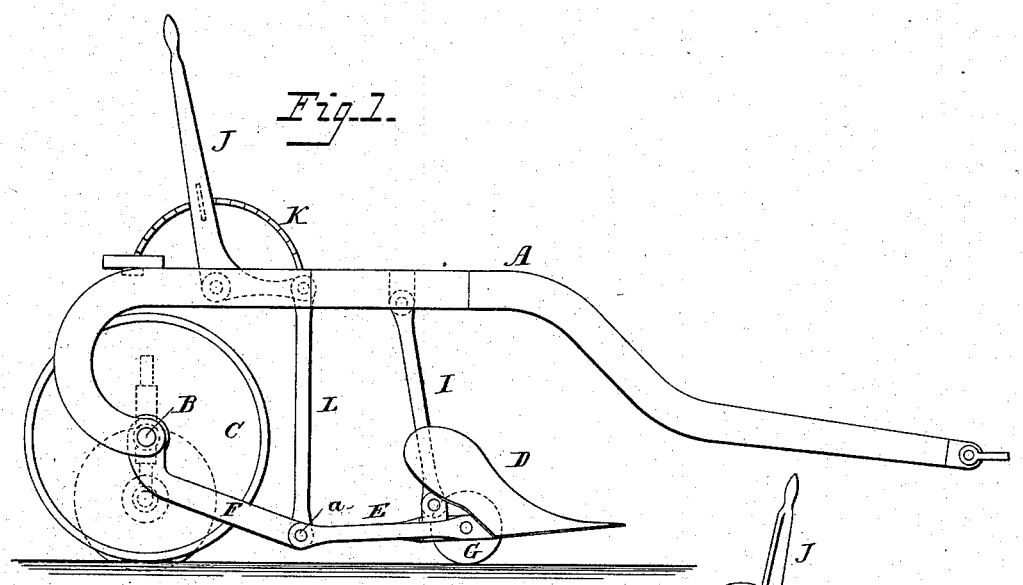
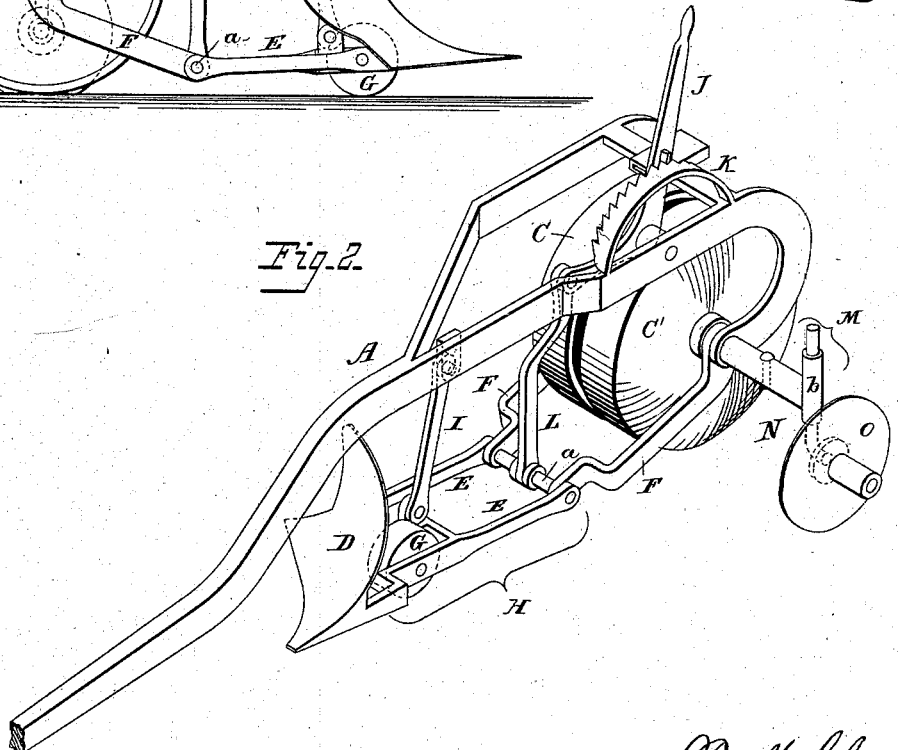
Attest:
Court A Cooper
William Paxton
R. M. Clark
Inventor
By his Attorneys
Presbrey & Green

United States Patent Office.

ROSWELL M. CLARK, OF McPHERSON, KANSAS.

WHEEL-PLOW.

SPECIFICATION forming part of Letters Patent No. 289,223, dated November 27, 1883.

Application filed April 23, 1883. (No model.)

*To all whom it may concern:*

Be it known that I, ROSWELL M. CLARK, of McPherson city and county, State of Kansas, have invented certain Improvements in Wheel-Plows, of which the following is the specification.

My invention relates to wheel-plows; and it consists in the construction and the combination of parts, hereinafter particularly described, and then sought to be specifically defined by the claims.

In the drawings, Figure 1 is a side view of the plow from the mold-board side, and Fig. 2 a perspective view from the land side.

In the drawings, the letter A indicates the beam, forked at its rear end and curved downward and forward, so as to support the axle B of the two wheels C C', arranged side by side, and the plow-supports are extended forward from the axle to cause a pushing instead of a pulling draft on the wheels to move the plow forward. This takes off the land-side pressure, the thrust being conveyed directly back to the bottom of the wheels, which fit between the forked ends of the beam, and run in the furrow, so as to be on level ground. By using two wheels instead of only one, and connecting them with the beam, as shown and described, the plow can be more readily turned than if but one wheel were used, it is kept from rocking, and is held level and steady, and the driver has a secure seat. A single wide wheel may, however, be employed. The plow D, which may be of any approved form, is rigidly connected to bars E, which are jointed, by a cross-pin, *a*, or otherwise, to the forward ends of arms F, hung to the axle B. The bars and arms thus connected form a jointed push bar or frame, H, for the plow, which permits the plow to be adjusted, as hereinafter specified. A friction-roller, G, has its bearings at the rear of the plow, close to the latter, so as to support it above the level of the ground, and a link, I, hinged or jointed to the plow-supporting frame H and to the beam, supports the plow and frame. A crank-lever, J, is pivoted preferably to beam A, so that a lip on its side will engage with the teeth of a curved rack-bar, K, supported upon the beam, and is connected by a link, L, with the cross-pin *a*, so that by moving the lever the plow-frame will be tilted on its support, and the point of the plow will be elevated or depressed to regulate the depth of the cut, the hinging of the arms to the axle and jointing of the bars to the arms permitting such adjustment of the plow without disturbing the position of the beam. The driver's seat is immediately over the two wheels C C', and the land side of the wheel C' is slightly convex, so that when it bears against the bank side of the furrow it will scour it instead of tearing it. The axle on the land side of the plow is extended outward far enough to receive a connection—as, for instance, a sleeve of a frame, M—carrying a crank-axle, N, which is provided with a revolving colter or cutter, O. The upright part of the axle N is held by pins or other means in the collar *b* of the frame M, and the latter is held by pins or other suitable means to the extended part of the axle B. The cutter may be held at any desired distance from the plow-beam or wheels C C' by adjusting the sleeve along the axle. As the cutter is located on the side of the plow and opposite to the wheels, it is made to cut a furrow on the side instead of in front of the plow, and at the same time serves to steady the plow during its locomotion. I reserve for other applications for Letters Patent any patentable features not specifically claimed.

I claim—

1. In a wheel-plow, the rigid beam A, supported by a wheel at the rear of the beam, the plow, the jointed frame connected to the plow and to bearings on the main frame at the rear thereof, and the lever for operating the jointed frame independently of the beam, to elevate and depress the plow, substantially as and for the purpose set forth.

2. In a wheel-plow, a jointed push-frame, the plow, a friction-roller for supporting the plow, and a supporting-link connecting the push-frame and beam, substantially as and for the purpose set forth.

3. In a wheel-plow, the combination of the plow, the jointed push-frame having a fulcrum between its ends, and connecting the plow and main frame, a lever for operating the push-frame to elevate and depress the plow-point, and a roller behind the plow, substantially as and for the purpose set forth.

4. The combination of a plow, side support carrying a revolving cutter, and adjusting devices, whereby the lateral and vertical positions of the cutter may be varied, substantially as set forth.

In testimony whereof I have signed my name to this specification in the presence of two subscribing witnesses.

ROSWELL M. CLARK.

Witnesses:
W. H. COTTINGHAM,
E. P. WILLIAMS.